United States Patent Office 2,696,474
Patented Dec. 7, 1954

2,696,474

METHOD FOR PREPARATION OF ALUMINA ORGANOSOLS AND HYDROSOLS

Llewellyn Heard, Hammond, Ind., assignor to Standard Oil Company, Chicago, Ill., a corporation of Indiana No Drawing. Application July 27, 1951,
Serial No. 239,019

9 Claims. (Cl. 252—309)

This invention relates to alumina sols and to the preparation and utilization thereof. More particularly, it relates to alumina organosols and to alumina hydrosols of increased $Al_2O_3$ concentration.

My invention is an improvement upon the invention covered by my United States Reissue Patent 22,196, issued October 6, 1942, in which an alumina hydrosol is produced by contacting amalgamated aluminum with hot water in the presence of a weak organic acid. The reaction by which the alumina hydrosol is produced is hydrolytic in nature, and the presence of an acid in the reaction mixture is not necessary in order for the reaction to proceed. However, in the absence of acid the alumina precipitates as rapidly as it is formed, and a weak organic acid is therefore incorporated in the reaction mixture as a peptizing agent, so that the alumina is obtained as a stable hydrosol.

The process covered by the said reissue patent was the first method by which an alumina hydrosol could be prepared substantially free from contaminating metallic ions, and thus represented a substantial advance in the art. In spite of its advantages, however, the process has a number of shortcomings. The maximum attainable $Al_2O_3$ concentration of the hydrosol is limited as a practical matter to approximately 4 per cent by weight. Higher concentrations can be reached by using larger concentrations of peptizing agent; but the resulting sols are undesirably viscous, and catalysts prepared therefrom are relatively inactive. The reaction time is excessive, as long as 24 hours or more being required at temperatures around 150° F. to carry the reaction to substantial completion. Moreover, as the reaction proceeds the viscosity of the sol increases greatly, and the evolving hydrogen produces a foam which may increase in volume until it occupies several times the volume of the reacting liquid. The seriousness of the foaming problem depends somewhat upon the specific peptizing agent employed, but no means has heretofore been found for completely eliminating the problem. Finally, the alumina hydrosol retains an objectionably high proportion of mercury— from around 0.04 to 0.08 percent by weight—which gives rise to a serious hazard during the drying of solid alumina compositions prepared therefrom.

I have now discovered a simple method by which hydrosols of 8 percent or more $Al_2O_3$ content can be made without foaming in a greatly reduced reaction time, with greatly reduced retention of mercury. In my new method, amalgamated aluminum is contacted at an elevated temperature with a dilute aqueous solution of a weak organic acid containing in addition to the said acid a neutral, water-miscible oxygenated organic solvent. A stable alumina organosol is produced thereby, which can be readily converted into a stable alumina hydrosol of increased $Al_2O_3$ concentration by removal of the organic solvent therefrom. When foaming is eliminated as in my present invention, the reaction can be greatly accelerated, so that the mixture of water, acid, and organic solvent can be passed through a bed of amalgamated aluminum and emerge as 3 percent $Al_2O_3$ sol with a contact time of 5 minutes or less. This cannot be accomplished with aqueous acid alone, owing to the difficulty with foaming. Moreover, the resulting organosol ordinarily contains only 0.001 percent by weight or less of mercury.

One object of my invention is to prepare an alumina organosol. Another object is to provide an improved method for preparing an alumina hydrosol. A further object is to prepare an alumina hydrosol of increased $Al_2O_3$ concentration. A still further object is to reduce the time required for reaction of amalgamated aluminum with water in the preparation of alumina hydrosols. An additional object is to minimize foaming during the preparation of alumina hydrosols. Another object is to provide an improved alumina base for catalytic mixtures. Another object is to prepare an improved hydrocarbon-conversion catalyst. Other objects of my invention and its superiority over the prior art will be apparent from the present description and from the appended claims.

A typical embodiment of the prior-art process for preparing an alumina hydrosol employs reactants in the following proportions:

500 ml. water
20 g. Al metal
1 g. HgO
8 ml. glacial acetic acid

In carrying out the prior-art process according to a preferred procedure, half of the glacial acetic acid is initially added to the water, and the mercuric oxide is dissolved in the resulting solution. The aluminum metal is then added, and immediately becomes amalgamated, since aluminum lies above mercury in the Electrochemical Series. The liquid is recirculated and heated to reaction temperature, ordinarily above about 150° F., and the remaining acetic acid is added in two or more portions several hours apart, with the object of reducing the foaming problem as much as possible. The resulting alumina hydrosol approaches a maximum $Al_2O_3$ content of about 4.0 percent by weight in a reaction time of about 24 hours.

In a simple embodiment of my improved process, 250 milliliters of the water in the above reaction mixture are replaced with 250 milliliters of aqueous 95 percent ethyl alcohol. All of the glacial acetic acid can then be added at the beginning of the reaction without causing foaming, and the sol-forming reaction proceeds smoothly at the boiling point of the mixture, where the temperature is conveniently maintained by condensing and refluxing the evolved vapors. When the $Al_2O_3$ concentration of the sol reaches about 3 percent by weight, the reaction rate diminishes somewhat. The sol is thereafter drained from the amalgam, the alcohol is removed by distillation, stripping, evaporation, or the like, and a stable alumina hydrosol is obtained having a concentration of approximately 6 percent $Al_2O_3$.

In a practical embodiment of my invention, I may employ apparatus or equipment as depicted in my U. S. Patent 2,449,847, issued September 21, 1948, which illustrates a continuous process for the preparation of alumina sols. A mixture of water, organic acid, and oxygenated organic solvent is passed through a reaction chamber containing a large excess of amalgamated aluminum, and is withdrawn therefrom as a 3 percent $Al_2O_3$ sol. The sol passes to an evaporator, where the organic solvent is recovered, together with some of the organic acid, and the sol emerges therefrom as an alumina hydrosol containing 6 percent $Al_2O_3$. The hydrosol is commingled with a catalytic adjuvant, and the mixture is gelled, dried, and calcined.

In my new process, substantially any non-acidic, water-miscible oxygenated organic compound is suitable for incorporation in the reaction mixture to accomplish the desired result. For this purpose, the term "water-miscible" is intended to include any compound of the defined class which is soluble in water to the extent of about 5 percent by volume or more at the temperature utilized for sol formation. The boiling point of the organic solvent additive is immaterial if an alumina organosol is desired, to be used without separation of the organic solvent therefrom. In a preferred embodiment of my invention, however, where the organic solvent is removed from the alumina organsol to produce an alumina hydrosol of increased concentration, the organic solvent should preferably have a boiling point below the boiling point of water, or should form a minimum-boiling azeotrope with water, so that the desired separation can conveniently be effected by fractional distillation or the like. Suitable organic solvents include glycols, such as ethylene glycol, propylene glycol, trimethylene glycol, and the like; aliphatic alcohols, such as methanol, ethanol, n-propanol, isopropyl alcohol, 1-butanol, 2-butanol, and the like; aliphatic aldehydes, such as acetaldehyde and the like; aliphatic ketones, such as acetone, methyl ethyl ketone, methyl n-propyl ketone, and the like; esters, such as methyl acetate, ethyl formate, ethyl acetate, and the like; hydroxy ethers, such as ethylene glycol monomethyl ether, ethylene glycol monoethyl ether, diethylene glycol monomethyl ether, and the like; glycol ethers, such as ethylene glycol dimethyl ether, diethylene glycol diethyl ether, and the like; cyclic compounds such as cyclohexanone, cyclohexanol, furfuryl alcohol, tetrahydrofurfuryl alcohol; and others, which may readily be ascertained from solubility data in the art. Among my preferred solvents are methanol, ethanol, and acetone.

The concentration of organic solvent in the reaction mixture should be at least about 5 percent by volume in order to produce the desired results, and I may employ up to about 95 percent by volume thereof, based upon the total reaction liquid. The reaction mixture must contain water in an amount at least stoichiometrically equivalent to the desired quantity of alumina in the completed hydrosol; and in order to achieve a reasonably rapid reaction rate, the proportion of water in the reaction mixture should be at least about 5 percent by volume. In the preparation of an organosol, I prefer that the water content of the reaction mixture be limited to between about 5 and 50 percent by volume, whereas in the preparation of a hydrosol, the water content is preferably between about 50 and 95 percent by volume.

The reaction of amalgamated aluminum with water in my new process can be carried out at temperatures as low as about 150° F. and as high as 250° F. or above. I prefer, however, to carry out the reaction at the boiling point of the reaction mixture, within the range of about 150 to 250° F., preferably with condensation and refluxing of the evolved vapors. Where necessary or desirable to maintain the reaction temperature at the desired level, the reaction can be carried out under reduced or elevated pressure.

My new process makes possible the use of a much greater range of organic acids as peptizing agents in the preparation of alumina sols. In the past, it has not been practicable to use acids of greater carbon chain length than acetic acid, owing to the fact that the solubilities of the paraffinic and olefinic carboxylic acids in water decrease with increase in length of the carbon chain. Now, however, with the inclusion of organic solvents in the reaction mixture, it has become possible to employ many other organic acids of greater chain length, including propionic, n-butyric, isobutyric, n-valeric, caproic, n-heptylic, caprylic, and other acids. The proportion of organic acid in the reaction mixture should in general be between about 1 and 4 percent by volume.

In all cases, the initial product of my new process is an alumina organosol containing up to about 4 percent by weight of $Al_2O_3$. This organosol can be depleted of uncombined water substantially or completely by distillation of a minimum-boiling water azeotrope therefrom, comprising the oxygenated organic solvent present in the organosol (where the said solvent forms such an azeotrope) or an added substance, such as hexane, benzene, or other light hydrocarbon, which form an azeotrope with water. A portion of the organic solvent can also be removed, if desired, by distillation, evaporation, or the like. By these means, an organosol can be obtained having an $Al_2O_3$ content up to around 12 percent by weight, preferably between about 6 and 8 percent as a practical maximum. Alternatively, the organic solvent alone can be removed, wholly or in part, to produce a hydrosol containing up to about 12 percent by weight of $Al_2O_3$. To facilitate this end, the initial concentration of the organic solvent can be suitably adjusted so that when the solvent is completely removed, the residual hydrosol contains the desired proportion of $Al_2O_3$. The optimum $Al_2O_3$ concentration lies between about 6 and 8 percent by weight. Sols of higher $Al_2O_3$ concentration are not as desirable for the preparation of catalytic mixtures because of their high viscosity and because of their tendency to set prematurely to hydrogels upon addition of catalytic adjuvants thereto, before uniform distribution of the adjuvant can be established.

My invention is illustrated by the following specific examples. It is to be understood, however, that the invention is in no sense limited to the specific process materials, procedures, and operating conditions embodied therein, but is applicable within the broad scope of the present specification.

Example I

A mixture of 1300 milliliters of water and 1300 milliliters of aqueous 95 percent ethyl alcohol was heated to a temperature slightly below the boiling point thereof, and to it were added 40 milliliters of glacial acetic acid, 2.5 grams of mercuric oxide, and 50 grams of aluminum punchings. The reaction proceeded rapidly at 180° F., the boiling point of the mixture, and the evolved vapors were condensed and refluxed to the reaction vessel. At the end of 3.5 hours approximately half of the aluminum had reacted, and at the end of 6.5 hours the reaction was stopped. The completed hydrosol contained $Al_2O$ in the proportion of 2.412 grams per hundred grams or 2.286 grams per hundred milliliters. The sol contained only 0.0002 percent of mercury. The distribution of the aluminum, calculated as $Al_2O_3$, was 57.2 grams as sol, 3.0 grams as sludge, and 41.5 grams as unreacted metal.

Example II

Glacial acetic acid (40 milliliters) was commingled with 1300 milliliters of water, and to the mixture were added 2.5 grams of mercuric oxide and 50 grams of aluminum punchings. The mixture was stirred at room temperature for one-half minute to effect amalgamation of the aluminum. Thereafter, aqueous 95 percent ethyl alcohol (1300 milliliters) was added, and the mixture was heated to reflux temperature, approximately 180° F., at which the reaction of the amalgamated aluminum with water proceeded vigorously. The reaction was stopped at the end of 12.5 hours, at which time a sol was obtained containing $Al_2O_3$ in the proportion of 2.454 grams per hundred grams or 2.316 grams per hundred milliliters. The mercury content of the sol was 0.001 percent. The distribution of the aluminum, calculated as $Al_2O_3$, was 57.9 grams as sol, 5.4 grams as sludge, and 37.8 grams as unreacted metal.

Example III

A mixture of 250 milliliters of water and 250 milliliters of acetone was heated to a temperature approaching the boiling point, and to it were successively added 1.0 gram of mercuric oxide, 8 milliliters of glacial acetic acid, and 20 grams of aluminum punchings. The mixture was then boiled (148° F.) and refluxed for 30 minutes, at the end of which time the reaction was stopped. The resulting viscous sol contained 3.89 grams of $Al_2O_3$ per hundred grams, and only $3 \times 10^{-5}$ percent Hg.

Example IV

A mixture of 1300 milliliters of water and 1300 milliliters of acetone was heated to a temperature approaching its boiling point, and to it were successively added 2.5 grams of mercuric oxide, 40 milliliters of glacial acetic acid, and 50 grams of aluminum punchings. The mixture was boiled (148° F.) and refluxed, and the reaction of the aluminum and water proceeded vigorously. The reaction rate began to level off at approximately 2 hours and became asymptotic near 22 hours, at which time the reaction was stopped. The resulting sol contained $Al_2O_3$ in the proportion of 2.118 grams per hundred grams or 2.050 grams per hundred milliliters. The distribution of the aluminum, calculated as $Al_2O_3$, was 51.3 grams as sol, 1.4 grams as sludge, and (by difference) 41.8 grams as unreacted metal.

Example V

A mixture of 1950 milliliters of water and 650 milliliters of acetone was heated to a temperature approaching its boiling point, and to it were successively added 2.5 grams of mercuric oxide, 40 milliliters of glacial acetic acid, and 50 grams of aluminum punchings. The mixture was boiled (157° F.) and refluxed. The initial reaction rate of the aluminum and water was greater than in Example IV, but levelled off at about 5 hours and became asymptotic near 22.5 hours, at which time the reaction was stopped. The resulting sol contained $Al_2O_3$ in the proportion of 3.322 grams per hundred grams or 3.322 grams per hundred milliliters. The distribution of the aluminum, calculated as $Al_2O_3$, was 83.1 grams as sol and 6.7 grams as unreacted metal. No sludge was formed.

The primary product of my invention is an organosol containing up to about 4 percent by weight of $Al_2O_3$, 5 percent by volume or more of a neutral water-miscible oxygenated organic solvent, from about 1 to 4 percent by volume of a weak organic acid, and any water remaining unutilized at the end of the sol-forming reaction. Such organosols are useful in themselves, for example in the production of alumina gels by addition of a weakly acidic electrolyte thereto. As an illustration, organosols containing formic acid yield alumina gels of medium density and other desirable properties, whereas comparable hydrosols yield gels that are very dense and difficult to pellet, and that exhibit objectionable carbon-forming tendencies in the conversion of hydrocarbons. My organosols can be converted into hydrosols of increased $Al_2O_3$ concentration, for example up to about 12 percent by weight, by removal of the organic solvent therefrom. Such hydrosols are especially convenient in the preparation of catalytic compositions, since alumina gels of excellent physical and chemical properties can be prepared therefrom, and since the ratio of water to alumina therein is so greatly reduced that the drying of the hydrogels prepared therefrom is greatly facilitated.

My organosols and hydrosols can suitably be commingled with any one or more of a wide variety of catalytic adjuvants, affording a mixture of alumina with silica, molybdena, chromia, platinum, palladium, vanadia, boria, iron, nickel, cobalt, or the like. The resulting mixture is gelled, washed if desired, dried, and reduced and/or calcined according to methods well known in the art. Alternatively, my organosols or hydrosols may first be gelled, then combined with a catalytic adjuvant, dried and calcined. Other techniques for the preparation of catalysts from the products of my invention will be apparent from the art.

My new process has numerous advantages over the prior art. The time required for producing sols of high alumina content has been reduced from the 24 hours formerly needed to as little as 5 minutes. This reduction has been largely accomplished by eliminating the problem of foaming, and as a result the size of the required apparatus has been markedly reduced. Moreover, the aluminum metal can now be more fully utilized. Temperature control is facilitated during the reaction of the amalgamated aluminum with water in my process, since the reaction is conveniently effected at the boiling point of the mixture. The quantity of mercury retained in the sol has been reduced to an inconsequential amount. Formic acid, which gave dense gels in the prior-art processes, can now be used to give much less dense gels by gelling the alumina organosol rather than the hydrosol. Many organic acids, relatively insoluble in water, can now be employed as peptizing agents owing to the fact that they are soluble in the organic solvents employed in my process. The recovery of the organic solvents from the organosol by distillation also effects recovery of some of the peptizing agent, which has heretofore been lost. Finally, it should be noted that the lower-boiling organic solvents have much smaller heats of vaporization than water, and gels produced therefrom can be dried at considerably lower cost. Thus, it is clear that my new process represents a substantial advance in the art.

While I have described my invention with reference to certain specific embodiments thereof, it will be understood that I am not limited thereto, but may practice my invention broadly within the scope of the present description and appended claims. It can further be said that any modifications or equivalents that would ordinarily occur to one skilled in the art are to be considered as lying within the scope of my invention.

In accordance with the foregoing description, I claim as my invention:

1. A method for preparing an alumina organosol which comprises contacting amalgamated aluminum at a temperature above about 150° F. with a dilute solution of a weak organic acid in a neutral, water-miscible oxygenated organic solvent, said solution containing water in an amount at least stoichiometrically equivalent to said alumina, whereby said amalgamated aluminum is converted into a fluid, substantially transparent alumina organosol, and withdrawing said organosol.

2. The method of claim 1 wherein said organic solvent is an alcohol.

3. The method of claim 1 wherein said organic solvent is a ketone.

4. A method for preparing an alumina organosol which comprises contacting amalgamated aluminum at a temperature above about 150° F. with a dilute solution of a weak organic acid in a neutral water-miscible oxygenated organic solvent, said solution containing between about 5 and 50 percent by volume of water, whereby said amalgamated aluminum is converted into a fluid, substantially transparent alumina organosol, and withdrawing said organosol.

5. An improved method for preparing an alumina hydrosol which comprises contacting amalgamated aluminum at a temperature above about 150° F. with a dilute aqueous solution of a weak organic acid containing, in addition to said acid, above about 5 percent by volume of a neutral, water-miscible oxygenated organic solvent boiling below about 212° F. in the presence of water, whereby said amalgamated aluminum is converted into a fluid, substantially transparent alumina sol, withdrawing said sol, and separating said organic solvent from said sol, whereby an alumina hydrosol is obtained.

6. An improved method for preparing an alumina hydrosol which comprises contacting amalgamated aluminum at a temperature above about 150° F. with a dilute aqueous solution of a weak organic acid containing, in addition to said acid, between about 5 and 95 percent by volume of a neutral, water-miscible oxygenated organic solvent, whereby said amalgamated aluminum is converted into a fluid, substantially transparent alumina sol, withdrawing said alumina sol, and separating said organic solvent therefrom, whereby an alumina hydrosol is obtained.

7. A method for preparing a concentrated alumina hydrosol which comprises contacting amalgamated aluminum at a temperature above about 150° F. with a dilute aqueous solution of a weak organic acid containing, in addition to said acid, a neutral, water-miscible oxygenated organic solvent, whereby said amalgamated aluminum is converted into a fluid, substantially transparent alumina sol containing a maximum of about 4 percent by weight $Al_2O_3$, withdrawing said sol, and removing said organic solvent therefrom, whereby an alumina hydrosol is obtained having an increased $Al_2O_3$ concentration.

8. An improved method for preparing an alumina hydrosol which comprises contacting amalgamated aluminum at a temperature above about 150° F. with a dilute aqueous solution of a weak organic acid containing above about 5% by volume of a water-miscible aliphatic alcohol boiling below about 212° F. in the presence of water, whereby said amalgamated aluminum is converted into a fluid, substantially transparent alumina sol, withdrawing said sol, and separating said alcohol from said sol, whereby an alumina hydrosol is obtained.

9. An improved method for preparing an alumina hydrosol which comprises contacting amalgamated aluminum at a temperature above about 150° F. with a dilute aqueous solution of a weak organic acid containing above about 5% by volume of a water-miscible aliphatic ketone boiling below about 212° F. in the presence of water, whereby said amalgamated aluminum is converted into a fluid, substantially transparent alumina sol, withdrawing said sol, and separating said ketone from said sol, whereby an alumina hydrosol is obtained.

References Cited in the file of this patent

UNITED STATES PATENTS

| Number | Name | Date |
|---|---|---|
| Re. 22,196 | Heard | Oct. 6, 1942 |
| 2,396,051 | Lans | Mar. 5, 1946 |
| 2,453,847 | Kimberlin | Nov. 16, 1948 |